Oct. 27, 1936.     J. F. WAIT     2,058,534
PROCESS OF TREATING HYDROCARBON OILS
Filed March 29, 1933
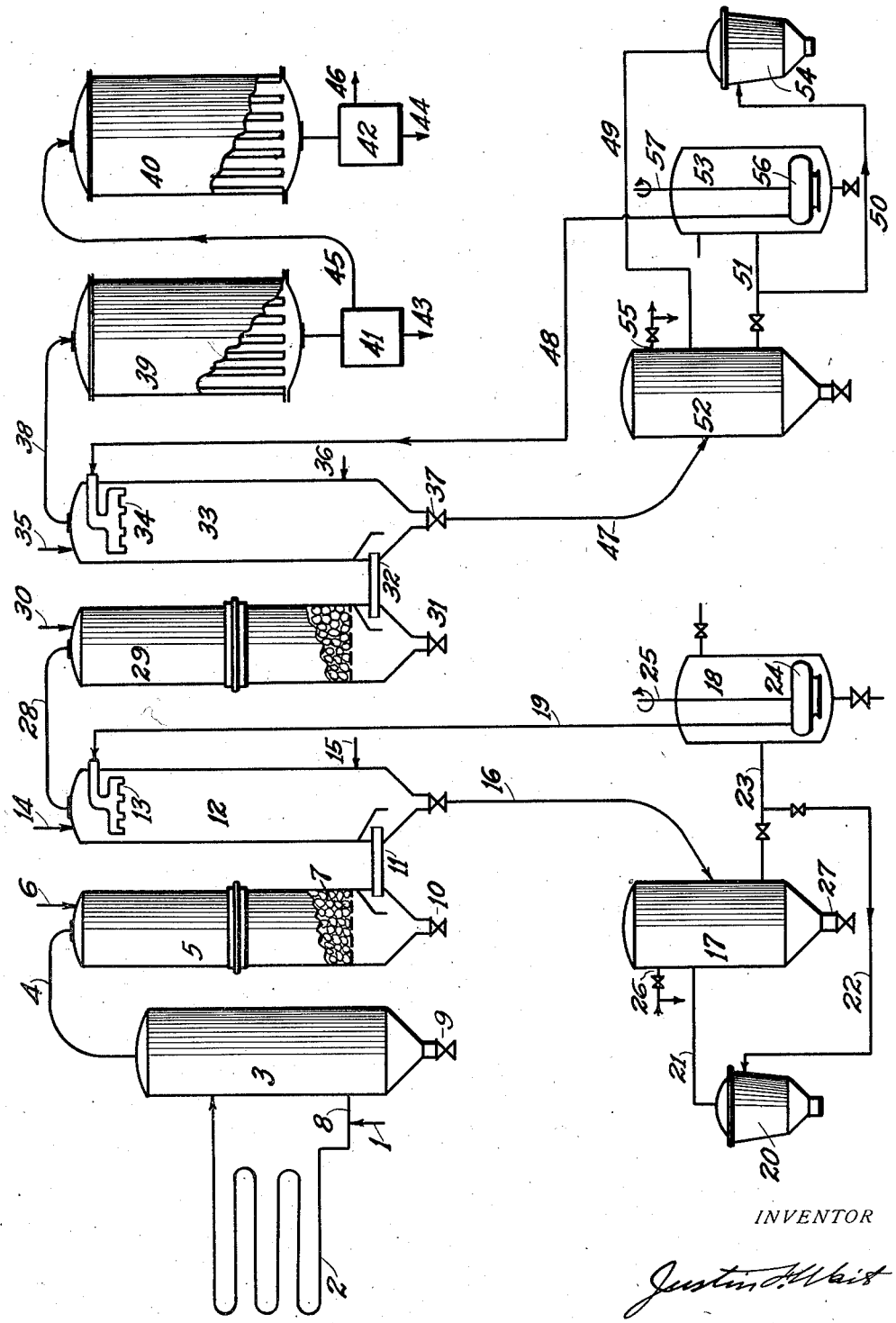
INVENTOR Patented Oct. 27, 1936

2,058,534

UNITED STATES PATENT OFFICE 2,058,534

PROCESS OF TREATING HYDRO-
CARBON OILS

Justin F. Wait, New York, N. Y.

Application March 29, 1933, Serial No. 663,369

13 Claims. (Cl. 196—13)

This invention relates to improvements in the methods of refining oils such as petroleum and the product therefrom and particularly to the production of oils which may serve as lubricants. The usual procedure for refining such oils involves distillation and treatment such as with a solvent agent or adsorptive agent or both. Thus as an example, light petroleum distillate may be removed from heavy distillate and the heavy portion may be treated with solvent such as sulfur dioxide or nitrated benzene. Sulfuric acid may be considered as having solvent action to some extent and is capable of otherwise improving oils being a common treating agent for the refining of petroleum.

I have found that the mono or the dinitro bodies of benzene, toluene, xylene and other coal tar products including mixtures thereof may be used and in instances another group such as methoxy, ethoxy, sulfo, phenyl, amido or combinations thereof may be used in association with one or two nitro groups as part of the organic compound for refining oils of petroleum by the general method hereof. Mixtures of similar substances such as are obtained by nitration, sulfonation, alkylation or other similar processing may also be used as a treating agent of my improved process. As an example toluene or benzene may be nitrated to form a substantial portion of dinitro bodies. Cooling will throw out one body for example meta dinitrobenzene which may be separated and the fluid mass may then be used for solvent.

Sulfuric acid has been used in various commercial concentrations for refining petroleum. I have found that 20% to 60% oleum or sulfuric acid with from about 10% to 30% of sulfur dioxide may be used as a step of my method and that in some instances nitrogen tetroxide or its equivalent may similarly be used to improve mineral oil. Oxygen may be used with such oxides of sulfur and nitrogen to promote oxidation and rearrangement by the hereinafter described method. Oxides of nitrogen may be also used alone as a solvent or in combination with oxysulfur compounds for quick treatment and with beneficial results.

Adsorptive agents have been commonly used. Such agents have been employed for treatment of the oil in either the vapor phase or the liquid phase and have been used in combination with sulfuric acid or similar treatment. In general such treatment has made relatively small improvement and this has been limited to removal of color and sulfur and substances contributing to high oxidation or carbon values. Gum forming substances have thus been lowered in amount or effect. I have found that adsorptive agents and absorptive agents as well may be used in combination with other steps as described herein to yield improved quality of oil. The use of nitrated hydrocarbons with a second nitro or other group, as an influence, may also be used in combination with the other steps. The preferred combination involves rearrangement under influence of an active metal with one unpaired electron such as sodium, which is preferably applied after such treatment and at between about 300° C. and 500° C. For this purpose adsorptive agents such as metals in solid form including those with two paired electrons, or metallic oxides may be used. Fuller's earth, bentonites and similar clay-like agents may be used. Silica gel though objectionable from some angles is usable for some adsorptive purposes and removes what may be regarded as impurities from the oil.

In one manner of utilizing adsorptive agents the oil is first rendered absolutely anhydrous or substantially so as a prior treatment which method is to be contrasted with the normal procedure wherein the oil invariably contains water in small but definite amounts or the equivalent thereof in hydroxy ions or groups. I also prefer to remove other substances equivalently possessed of hydroxy ions or groups such as phenolic bodies may be included in the oil to be treated. Oil may be freed from water or such groups as by means of sodium or other similar metals with one unpaired electron or their amides and preferably by contact with the metal in a molten condition and at a temperature which is considerably elevated. Thus for example a temperature of between about 300 and 400° C. is often required or desired to produce results. This preliminary treatment is preferably of short duration and may involve use of such metal as sodium or potassium or aluminum in admixture with molten caustic or alkali salts. Such treating agents may be prepared in situ in the manner as generally described in Patent No. 1,913,145 whereby special activity is obtained especially when the treating agent is continuously or intermittently refreshed as by additions from materials of an electrolytic cell.

Impurities removed by adsorption as by solid metals and compounds thereof such as clay-like substances may be those normally occurring in the oil or those which have been produced therein as by oxidation, metal contact or other treatment. In some instances the impurities may be of both of these two general kinds. Their nature and susceptibility to treatments determine choice as to contact with solid adsorptive agent in the vapor or in the liquid phase, the former being preferable in many instances especially with light and easily distilled oils. Controlled oxidation with or without molecular rearrangement of the oil appears to render certain small portions of oil in a form which is more readily removable by contact with adsorptive agent.

The absorptive agent, if a nitrated body, may also be used to promote mild oxidation for which purposes the temperature is preferably elevated as to substantially above about 200° C. or 250° C. Nitro bodies often thus become reduced to amido containing substances which may couple with aldehyde or other formations and thus facilitate separation or even isolation and release as with acid. An amido group may be added so as to be present during mild oxidation and to facilitate removal of oxidized compounds. Such treatment with a nitro body at a reactive temperature is to be distinguished from use of nitrobenzene for example as a solvent such treatment generally reducing color and increasing viscosity index. Solvent action may be combined with chemical reaction.

Oxidation may be preceded by a rearrangement of the kind described with metal or of other kind, as for example, ordinary cracking. In general it is desirable to follow controlled mild oxidation by rearrangement under the influence of sodium or the like in either pure or diluted form. The rearrangement may be such as to greatly improve the viscosity index and to alter undesirable components into a form which may be removed by means of the light active metal. This combination of mild oxidation and treatment with active metal renders the oil unnecessarily stable. Treatment with fused substances such as alkali hydroxide which preferably contains a dehydrating agent such as sodium or potassium or sodamide may be used as between oxidation and rearrangement or as a preliminary step. Aluminum chloride in combination with such molten metals as sodium or aluminum may be used as one step of the treatment some oils readily responding to such treatment. The exact treatment to be used, including the number of steps and the agents and the temperature, is generally required to be different with oils of different origin and these are established or controlled in view of the final products desired and properties thereof.

In rearrangement promoted or influenced by treatment with a metal with an unpaired electron such as sodium, potassium and aluminum undesirable components may be added to by appropriate application of such metal. Light active metals such as sodium, potassium and aluminum may be used alone or in mixtures or with fused substances containing such compounds as hydroxides of sodium, potassium or calcium. Metallic halides or sulfates or mixtures may be used in conjunction with such free metal. When used alone they are preferably substantially free from water in at least one contact stage. My preferred conditions of utilization of such treating substances involves substantially elevated temperatures, thus excellent results have been obtained with some oils when so contacted at a temperature between about 250° C. or 300° C. and 500° C. Two or more stages of treatment with such agents are often desirable one being at a different temperature from another as for example one at about 300° C. and another at about 400° C. A third may be at between about 450° C. and 500° C. At such temperatures a sort of cracking is brought about but under the influence of fluid active agent preferably of or containing one of the above metals in the free state. Thus contrary to ordinary belief that cracking destroys oils and is detrimental to methods of producing lubricating oils, my preferred mode of operation involves such sort of cracking under the action of special metals at certain temperatures, and preferably wherein impurities are carried away about as formed and the metal is recirculated through a purifying zone. The amount of cracked (that is portions reduced to about a half or somewhat less of molecular weight) oil may be up to 20% or more and by thus purposely promoting such cracking I have found that a better and more stable lubricating oil is ultimately obtained by following the steps indicated herein. By this unique method more desirable forms or amounts of certain marketable distillates are formed. With mixtures, the concentration of a selected metal may be varied and controlled as for example from about a trace up to fifty per cent or more, in some instances, the sum of the active metals in a mixture may be close to 100%. Thus a few per cent of aluminum and/or potassium with the balance of sodium is beneficial to some oils and more preferable than treatment with a single metal alone. The results so obtainable often justify use of the more expensive metals or mixtures. It seems that with increased activity of selected metals, the treatment may in general be conducted at a somewhat lower temperature and/or with a less time of contact.

Subsequent to treatment by the above described steps including application of a light active metal with one unpaired electron, it is often desirable to control the acidity or the oxidation—reduction potential. By this means the metal treated oil may be given desirable qualities such as greater stability. Alkaline substances may be used in the form of amines or acidic substances may be used. The acidity may be changed but little by adding both acidic substance and basic substance thus giving rise to what I might term a salt action which may increase the electric conductivity without increasing the acidity. A form with an "acidity" approaching that of benzol is often desirable and may be obtained in the manner indicated. Such control of acidity or of the oxidation potential is advantageously applied before oxidation or rearrangement.

In treating light distillate or in treating lubricating oil with a solvent such as liquid sulfur dioxide for example the dissolved portion is apparently of greater unsaturation than the undissolved portion the latter portion in turn containing from about one to a few percent of sulfur dioxide. The method of treatment and recovery of the solvent and isolation of the oil is known. I have found that the part removed to improve the quality of the lubricating oil or lighter distillate may be treated with the resulting production of an oil of improved properties. Thus the portion absorbed or extracted by a solvent such as liquid sulfur dioxide may be treated as previously indicated to yield oil of substantial commercial value.

One manner in which the properties may be improved is to contact such oil with acid removing means such as aqueous alkaline wash and subsequently dehydrating to remove substantially all of the water. The oil is then contacted, preferably in the vapor phase, with molten alkali containing free metal such as sodium with one unpaired electron. Suitable combination of treatments of selected temperature and kind and concentration of such treating agent is worked out for each case. In the case of some oils I have found it advantageous to heat the oil to about 400° C. to 500° C. and to contact a molten mass containing such metal with the oil at the heating zone or closely situated zone so that metallic contact is had to practically simultaneously influence rearrangement. In general the use of such molten mass promotes pronounced rearrangement at lower temperatures and with less destruction as into fixed hydrocarbon gases than is otherwise the case. In some instances fixed gases and/or hydrogen may be simultaneously contacted and with the ultimate lowering of the total amount of fixed gas produced in the refining process. Without committing myself to the exact mechanics of the reaction I state that the result is seemingly the consumption of such fixed gases by rearrangement to form heavier molecules or it is the equivalent of preventing the formation of as great an amount of substances of the lower range of molecular weight.

The treatment at above about 400° C. may be of short duration but is controlled to yield substantial rearrangement at close to or about what is commonly termed the cracking temperature. The required time is within about a minute or so and in some instances a matter of within one or about a few seconds. The longer times are generally required when the temperature is appreciably below about 400° C. as for example at about 320° C. to 350° C. With some oils I have found evidence of some rearrangement at temperatures of about 275° C. to 300° C. when sufficient time of contact has been afforded.

The rearrangement generally produces up to about ten or twenty percent of materially lighter oil. Thus an oil of lubricating range has been found to yield oil of mineral seal and kerosene range. A few percent of the oil is often of gasoline range. The amount of fixed gas formed is generally less than about ten percent of the total yield of oil of lowered boiling point and in some instances I have been able to absorb fixed gases and in other cases hydrogen. For such operation it appears desirable to contact the gases with relatively light distillate and under pressures of over about a hundred pounds with the most desirable pressure being a few hundred pounds under which pressure I prefer to have a large proportion of fixed gases as regards liquid. I have found that fixed gases alone may be so rearranged as to yield liquid hydrocarbon some of which may be of lubricating range but I generally prefer to utilize from a few to about fifty percent of vapors of light distillate for absorption by rearrangement in contact with fixed gases. I prefer to use fixed gases which have been recently formed (within a minute or so prior to contact) or which have been recently activated by heating to about 400° C.

Oil separated from solvent such as sulfur dioxide and dried as by well known means may be treated by the illustrated arrangement. As is commonly known the extracted portion derived by such procedure with sulfur dioxide is higher in aromatics, unsaturated compounds and sulfur than is the remaining portion of extracted oil. The extracted oil or the oil "purified" by extraction may be used as the oil to be treated. It is shown as being introduced by line 1 into a heater 2 with fire box not illustrated. In some instances I add treating agent such as dinitrobenzene or sodium or both on introduction. The hot mass is passed into vessel 3 whereat vapors separate and pass through line 4 to treating chamber 5 which may be used for adsorption of impurities or for oxidation by introducing slight amounts of oxygen through line 6. Where fixed gases and/or hydrogen is to be used they may be introduced through line 6 to the exclusion of oxygen. Suitable catalyst 7 may be used to promote action or the mass 7 may be of adsorptive substance such as acid-treated clay to influence the reaction or collect deposited impurities. Such impurities may be later treated in the indicated manner or modification thereof. Liquid deposited in vessel 3 may be passed through heater 2 as by means of a pump not illustrated to promote further change by heat. At times a continuously formed residual matter may be discharged through outlet 9. Vessel 3 may be provided with an agitator and temperature control means and with means for introducing treating agent or gaseous fluid hydrocarbon therein.

Liquid collected in vessel 5 may be drained through outlet 10 which may also be used for passage of the fluids to a condenser and evaporator connecting to vessel 12 as an alternate to the direct connection 11 or as a supplement thereto so that a portion of the fluid may be condensed within vessel 5 or withdrawn as gaseous fluid. Condensation and evaporation as for example between vessels 7 and 12, is preferable where treating agent such as excessive amounts of oxygen is to be removed or when resinous forming or other substances are to be then withdrawn.

Treating agent such as anhydrous caustic may be applied in vessel 12 by discharge from distributor 13. Fixed gases or other gaseous parts such as other vapors may be introduced by means of line 14 or line 15. The treating agent may flow through line 16 to storage and separating tank 17 connecting with pump tank 18 and return line 19 by means of which the caustic or other substance or mixture may be recirculated. A cell 20 may be used to electrolyze the circulated mass as for rendering it anhydrous. Lines 21, 22 and 23 connect the apparatus as indicated and pump 24 with shaft 25 may be used to circulate the treating agent. Lines such as 26 and 27 may be used to drain or discharge selected portions of the mass as for extraction of resinous material or to deliver and return the mass to and from treating or recovery apparatus not illustrated.

Vapors of the treated mass may flow out of chamber 12 as by means of line 28 to secondary treating zone 29, to be used as described for vessel 5. Thus 5 may be for oxidation and 29 for treatment with hydrogen or fixed gases or vapors may be added at 5 and gases at 29. The appropriate procedure must be worked out for each oil in view of results desired.

Gaseous fluid from 12 may be condensed, fractionated, reevaporated or otherwise treated before entering chamber 29. Line 30 may be used to introduce gases or vapors or mixtures thereof and line 31 may be used for discharge or drainage in a manner similar to that described for line 10 of vessel 5. Gaseous fluid from 29 is passed through line 32 to reaction chamber 33 whereat alkali metal or mixture of alkali with such metal may be introduced by means of distributer 34. Fixed gases or vapors may be introduced by means of connections 35 and 36. Although countercurrent flow is illustrated, I often prefer concurrent flow as regards treating agent and the vaporous mass. Thus line 32 may enter vessel 33 similarly to entrance of line 35.

Circulated treating agent and condensed hydrocarbon may pass through outlet 37 and vaporous matter through line 38 to condensers 39 and 40 or other fractionating means. Separators 41 and 42 are illustrated with liquid outlets 43 and 44 and vapor or gaseous outlets 45 and 46. Line 46 may connect with other fractionating units and to pressure control means. The pressure in 33 may be maintained differently from that in vessel 12 as by regulating a control means between vessel 12 and vessel 29.

Lines 47 and 48 may be used for circulation of treating agent. These and other lines may be heated to maintain proper temperature of treating agent. Lines 49, 50 and 51 are schematically shown for flow of treating agent. Storage and separating vessel 52, pump 53, cell 54 and lines 55 may be used for handling and treating the mass. Circulation may be promoted by means of pump 56 with drive shaft 57.

I realize that each kind of oil must be treated experimentally to determine the exact procedure. The results of cut-and-try methods are used to determine the operation in view of obtainable results and those desired. The illustrated system is given to indicate the general procedure. I do not limit my claims to the procedure disclosed as other equivalent methods may be employed.

Details of procedure and apparatus or steps which may be employed are disclosed in Patent No. 1,913,145 and prior applications including the following:—Ser. Nos. 482,267, 490,331, 558,844, 613,080, 613,081, 613,150, 613,151, 627,170, 627,171, 636,937, 641,558, 659,900, 660,031, and 661,095.

I claim:

1. The process of refining oil of petroleum which comprises contacting said oil in liquid form with a solvent, separating said solvent and absorbed portions of said oil oxidizing separated portions of oil lightly and subsequently contacting vapors of said portions of oil with a fluid containing a metal with one unpaired electron which is light and active and which will promote desirable rearrangement within the oil when contacted with the same at a temperature of between about 300° C. and about 500° C.

2. In refining oil from petroleum, the steps which comprise absorbing impurities with a solvent of the nitrated aromatic type to simultaneously oxidize and abstract portions, treating the so purified oil with an alkali metal and maintained at a temperature between 250° C. and about 500° C., so causing rearrangement, and adsorbing impurities with a clay-like substance by contact adsorption.

3. The process which comprises treating oil with a mild oxidizing agent, contacting said oil with an absorbtive agent such as nitrated benzene, separating said oil from said absorbtive agent and portions rendered removable thereby and contacting the so treated oil with an active metal with one unpaired electron held in contact relation therewith at a cracking temperature for less than about a minute to promote rearrangement under the influence of the metal.

4. The process which comprises treating oil with a mild oxidizing agent, contacting the so treated oil with an absorbtive agent, separating treated oil from said absorbtive agent and portions rendered removable by said treatment, contacting the so separated and purified oil with a fused compound of an active alkaline metal and contacting the so treated oil with an active metal with one unpaired electron held in contact relation therewith at a temperature between about 300° C. and 500° C. while continuously removing from the contact zone impurities formed by contact of the treated oil with the metal.

5. The process of forming lubricating oil which comprises treating heavy oil with sulfur dioxide, so removing small portions of oil which are detrimental to a lubricant, neutralizing the so treated oil with aqueous alkali, removing substantially all water from the oil and contacting the oil with an active light metal with an unpaired electron at a temperature between about 250° C. and 500° C. and so materially increasing the viscosity index of said oil and producing an oil of very color.

6. The process which comprises treating oil with a nitrated aromatic solvent to dissolve impurities and so increasing the viscosity index, contacting the so-treated oil with an alkali metal at a temperature between about 300° C. and 500° C. and so further increasing the viscosity index of said oil.

7. In the process of refining petroleum to produce a lubricating oil the steps which comprise extracting as soluble components aromatics and unsaturates from an oil containing the same with a selective solvent removing the solvent from the extracted components, vaporizing the extracted components, oxidizing the vaporized extracted components mildly, treating the oxidized vapors with a fused mass of anhydrous alkali hydroxide containing a molten alkali metal at a temperature of between about 300° C. and about 500° C., and in a manner to promote desirable rearrangement of minor portions of said components, and so forming a stable lubricating oil of improved quality.

8. The process of refining a petroleum oil distillate which comprises contacting said distillate in liquid form with a selective solvent to dissolve the aromatic and unsaturated portions of said oil, separating said solvent from the dissolved portions, oxidizing the dissolved portions of the oil mildly in the vapor phase and subsequently contacting the oxidized vapors with an anhydrous fluid containing free alkali metal at a temperature of between about 300° C. and about 500° C. to promote desirable rearrangement of a minor portion of the vapors and a major portion of improved lubricating oil.

9. In cracking heavy oil which has been separated from purified lubricating oil by solvent fractionation which comprises treating said heavy oil in vapor phase with an alkali metal at about the cracking temperature and subsequently mildly oxidizing a heavy portion of the oil and treating the mildly oxidized portion with an alkali metal at between about 300° C. and about 500° C. for a short period of time and so rendering the oil more stable and improving the viscosity index thereof.

10. The process of refining petroleum which comprises extracting aromatic and unsaturated portions of heavy mineral oil by means of a solvent such as sulfur dioxide, separating the extracted oil from the extracting agent, evaporating the so fractionated portion of oil containing large amounts of aromatic and unsaturated hydrocarbons and flowing the vapors thereof through a zone of contact with an alkali metal at a temperature of between about 300° C. and about 500° C. while limiting the time of contact to about a minute or so, so rearranging the oil and forming a substantial amount of light hydrocarbon therefrom, fractionating vapors so treated and liquefying heavy portions and separating light hydrocarbons from heavier ones producing an improved oil of lubricating range.

11. The method of utilizing impurities of petroleum separated by solvent fractionation by such a reagent as sulfur dioxide, which comprises flowing vapors of the extracted portion through a reaction zone held at above 250° C. and below 500° C., circulating a fused mass containing alkali metal through the zone in a manner to alter and remove impurities, limiting the time of contact between the vapors and the metal to a period of about a minute or so, fractionating oil of the vapors so treated and forming therefrom a portion of lubricating range of improved viscosity index.

12. The process of refining lubricating oil and improving a byproduct which comprises extracting hydrocarbon impurites from petroleum of lubricating range by application of a solvent, separating extracted portions from solvent and applying alkali metal as a circulated stream to the separated extracted portion at about three or four hundred degrees centigrade to rearrange from about two to twenty percent of the oil into materially lighter oil and separating substantial portions of the formed light oil from heavier oil to yield oil of lubricating range and substantially improved viscosity index.

13. The method of forming an improved lubricating oil which comprises extracting oil containing portions of lubricating range with a solvent such as sulfur dioxide to produce less desirable aromatics and unsaturates and passing the extracted portion, freed from solvent, in vaporous form through a multiplicity of zones of contact with alkali metal and circulating a molten mass containing alkali metal through each of the zones while maintaining the temperature thereof at between about 300° C. and about 500° C. and limiting the time of contact of the vapors with the molten stream to about a minute or so and thereby producing a desirable rearrangement of portions of the extracted oil and improving the viscosity index thereof.

JUSTIN F. WAIT.